UNITED STATES PATENT OFFICE.

JONATHAN G. HOLLAND, OF SANDY HILL, NEW YORK.

IMPROVEMENT IN MEDICATED BEVERAGES.

Specification forming part of Letters Patent No. 222,187, dated December 2, 1879; application filed May 2, 1879.

*To all whom it may concern:*

Be it known that I, JONATHAN G. HOLLAND, of Sandy Hill, Washington county, and State of New York, have invented a certain compound designed to be used as a tonic beverage and bottled drink, of which the following is a specification.

My invention belongs to that class of compounded drinks or beverages made of decoctions, flavored, and then, by means of added brewer's yeast, caused to effervesce when discharged from the bottle containing them by the development of carbonic-acid gas produced by the yeast.

My invention consists in the employment of a decoction of hops, flavored with coriander-seed, grains of paradise, and licorice-extract, made medicinally tonic by means of elecampane-root, dandelion-root, sarsaparilla-root, and pleurisy-root, sweetened, and then made effervescent by the use of brewer's yeast, and is prepared in the following manner. I make a decoction in forty gallons of boiling water of the following materials: One and one-half pound of hops, one-half pound of elecampane-root, two ounces of dandelion-root, four ounces of sarsaparilla-root, two ounces of pleurisy-root, five ounces of licorice-extract, four ounces of coriander-seed, and two ounces of grains of paradise. The decoction made as described is then strained, and to it there are added thirty pounds of sugar, and finally brewer's yeast sufficient to work the same, in quantity varying from one to three pints, a less proportion of which is required during warm weather than in winter. The compound is then bottled, and in a few days is ready for use.

While I have named a specific quantity of the different ingredients, I do not wish to be understood as limiting my invention to such proportion. The materials employed being harmless in their effects, the proportion used may be varied without changing materially the character of the compound, unless some one of the elements employed was so changed in proportion as to alter materially the flavor or effect of the mixture. The medicinal tonic and alterative effects of the compound will be the same should the flavoring elements be omitted.

Having thus described my invention, what I claim, and desire to secure by Letters Patent, is—

A tonic and alterative effervescing drink composed of hops, elecampane-root, dandelion-root, sarsaparilla-root, pleurisy-root, licorice-extract, coriander-seed, grains of paradise, sugar, and brewer's yeast, prepared in the manner herein described.

Signed at Troy, New York, this 22d day of April, 1879.

JONATHAN G. HOLLAND.

Witnesses:
JOHN T. LEE,
WM. F. COMINGS.